(12) United States Patent
Mallard et al.

(10) Patent No.: US 11,631,908 B2
(45) Date of Patent: Apr. 18, 2023

(54) BATTERY SYSTEMS AND METHODS

(71) Applicant: Ford Global Technologies, LLC, Dearborn, MI (US)

(72) Inventors: William John Mallard, Southend on Sea (GB); Owen David Styles, Chelmsford (GB)

(73) Assignee: Ford Global Technologies, LLC, Dearborn, MI (US)

( * ) Notice: Subject to any disclaimer, the term of this patent is extended or adjusted under 35 U.S.C. 154(b) by 269 days.

(21) Appl. No.: 17/114,862

(22) Filed: Dec. 8, 2020

(65) Prior Publication Data

US 2021/0194073 A1 Jun. 24, 2021

(30) Foreign Application Priority Data

Dec. 20, 2019 (GB) ...................... 1919054

(51) Int. Cl.
| | | |
|---|---|---|
| *H01M 10/48* | (2006.01) | |
| *B60L 58/27* | (2019.01) | |
| *H01M 10/613* | (2014.01) | |
| *H01M 10/615* | (2014.01) | |
| *H01M 10/625* | (2014.01) | |

(Continued)

(52) U.S. Cl.
CPC .......... *H01M 10/482* (2013.01); *B60L 58/27* (2019.02); *H01M 10/4207* (2013.01); *H01M 10/486* (2013.01); *H01M 10/613* (2015.04); *H01M 10/615* (2015.04); *H01M 10/625* (2015.04); *H01M 10/656* (2015.04); *H01M 2220/20* (2013.01)

(58) Field of Classification Search
None
See application file for complete search history.

(56) References Cited

U.S. PATENT DOCUMENTS

| | | | |
|---|---|---|---|
| 2004/0189260 A1* | 9/2004 | Kimoto | H01M 10/651 320/150 |
| 2011/0153140 A1 | 6/2011 | Datta et al. | |

(Continued)

FOREIGN PATENT DOCUMENTS

| | | |
|---|---|---|
| DE | 102013018411 | 5/2015 |
| EP | 3376580 | 9/2018 |

(Continued)

*Primary Examiner* — Amanda J Barrow
(74) *Attorney, Agent, or Firm* — David B. Kelley; Carlson, Gaskey & Olds, P.C.

(57) ABSTRACT

A method for a battery system for a vehicle is provided. The battery system can include a plurality of battery modules and a heat transfer assembly. Each of the battery modules can include one or more cells. The battery modules are selectively electrically connectable to a terminal of the battery system in order to provide electrical power to the vehicle. The heat transfer assembly can selectively adjust thermal energy levels of one or more of the battery modules. The method can include determining a desired capacity of the battery system, determining a number of the battery modules to have thermal energy levels adjusted by the heat transfer assembly according to the desired capacity of the battery system, and operating the heat transfer assembly to adjust thermal energy levels of the determined number of battery modules.

17 Claims, 3 Drawing Sheets

(51) Int. Cl.
*H01M 10/656* (2014.01)
*H01M 10/42* (2006.01)

(56) References Cited

U.S. PATENT DOCUMENTS

| | | | |
|---|---|---|---|
| 2013/0004820 A1* | 1/2013 | Tennessen | H01M 10/613 |
| | | | 429/120 |
| 2013/0108896 A1 | 5/2013 | Daniel et al. | |
| 2016/0285144 A1* | 9/2016 | Song | H01M 10/6557 |
| 2017/0008419 A1 | 1/2017 | Kim | |
| 2017/0133731 A1 | 5/2017 | Hermann | |
| 2018/0252195 A1 | 9/2018 | Ciaccio et al. | |
| 2019/0081372 A1* | 3/2019 | Capati | H01M 50/516 |

FOREIGN PATENT DOCUMENTS

| | | |
|---|---|---|
| JP | 2013157111 | 8/2013 |
| WO | 2012147128 | 1/2012 |

* cited by examiner

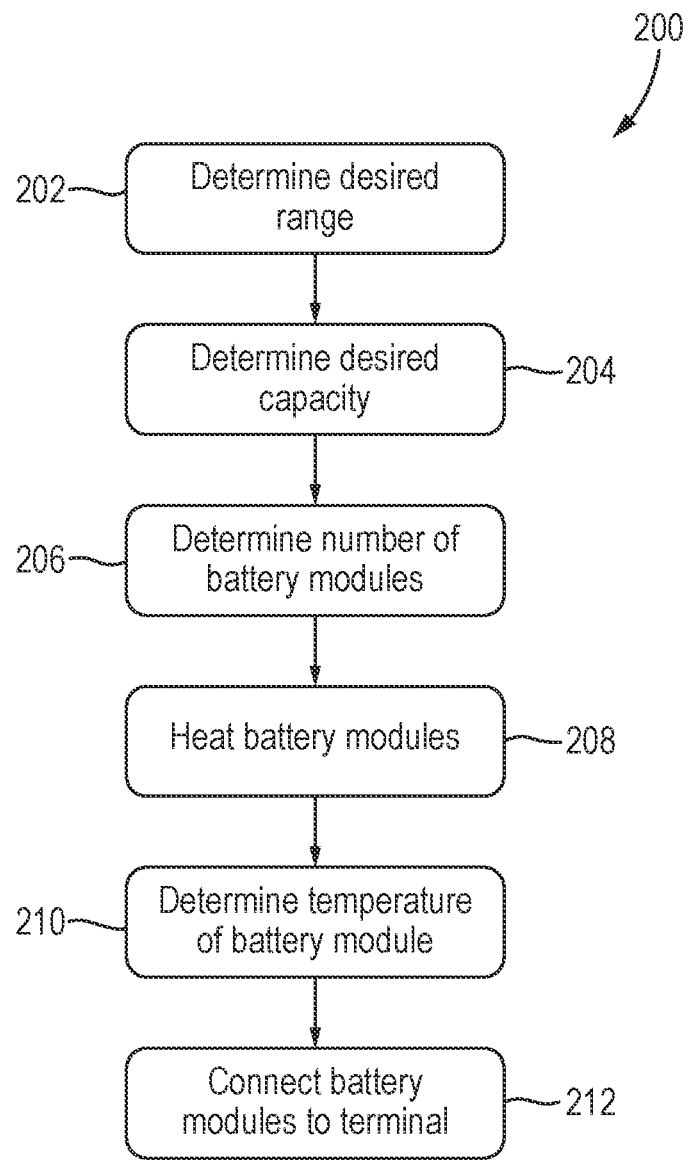

BATTERY SYSTEMS AND METHODS

CROSS-REFERENCE TO RELATED APPLICATIONS

This application claims priority to GB Patent Application No. 1919054.5, which was filed on 20 Dec. 2019 and is incorporated herein by reference in its entirety.

TECHNICAL FIELD

The present disclosure relates to a battery system for vehicles and is particularly, although not exclusively, concerned with battery systems with improved temperature management.

BACKGROUND

Vehicles, such as hybrid motor vehicle and electric vehicles, may comprise an electric motor for driving the movement of the vehicle. Such vehicles typically comprise a plurality of battery cells for providing electrical energy for powering the electric motor.

The electrical system of the vehicle may be operated within a broad range of temperatures between sub-freezing and hot summer conditions. However, the efficiency of battery cells within the electrical system can vary significantly depending on the temperature at which the electrical system is operating.

It is beneficial for the battery cells being used to power the vehicle to reach a desirable operating temperature quickly, in order to limit the time during which the battery cells are supplying power with reduced efficiency.

SUMMARY

According to an exemplary aspect of the present disclosure, there is provided a method for a battery system for a vehicle. The battery system includes a plurality of battery modules. Each of the battery modules includes one or more cells. The battery modules are selectively electrically connectable to a terminal of the battery system in order to provide electrical power to the vehicle. A heat transfer assembly can be used for selectively heating and/or cooling one or more of the battery modules. The method for such a battery system can include determining a desired capacity of the battery system, determining a number of the battery modules to be heated and/or cooled by the heat transfer assembly according to the desired capacity of the battery system, and operating the heat transfer assembly to heat and/or cool the determined number of battery modules. Each one of the battery modules to be heated or cooled being one of heated or cooled.

The heat transfer assembly may be capable of selectively heating one or more of the battery modules or may be capable of selectively cooling one or more of the battery modules. Alternatively, the heat transfer assembly may be capable of both heating and cooling one or more of the battery modules, e.g., depending on its operation. The heat transfer assembly may be capable of heating one or more of the battery modules and cooling one of more others of the battery modules at the same time.

The method may comprise electrically connecting the determined number of battery modules to the terminal, e.g., in parallel with one another. For example, in order to provide power for driving the vehicle. The number of battery modules may thereby be connected to the terminal in order to supply a desired amount of energy to a vehicle being powered by the battery system.

The number of battery modules heated and/or cooled by the heat transfer assembly may correspond to the number of battery modules required to be connected together in order for the battery system to provide the desired capacity.

The method may further comprise determining a desirable range, e.g. potential travel distance, of a vehicle to be powered by the battery system. The desired capacity of the battery system is determined based on the desirable range of the vehicle.

The method may comprise determining a journey to be performed by the vehicle, e.g., which the vehicle is currently performing or is about to perform. The desirable range of the vehicle is determined based on a length of the journey to be performed. For example, the journey may be the next journey to be performed by the vehicle.

The method may comprise receiving information from a navigation system indicating a distance of a journey planned or predicted to be travelled by the vehicle. The desirable range of the vehicle is determined based on the information from the navigation system.

The method may comprise determining a temperature of a battery module. The method may further comprise comparing the determined temperature to a desirable operating temperature range of the battery module. The method may comprise operating the heat transfer assembly to heat or cool the battery module if the determined temperature of the battery module is outside the desirable operating temperature range. In particular, the heat transfer assembly may be operated to cool the battery module if the determined temperature of the battery module is above the desirable operating temperature range or heat the battery module if the determined temperature of the battery module is less than the desirable operating temperature range.

The method may further comprise connecting the battery module to the terminal if the determined temperature is within the desirable operating temperature range. The method may further comprise disconnecting the battery module from the terminal, e.g., if the determined temperature is outside the desirable operating temperature range.

According to another aspect of the present disclosure, there is provided a battery system for a vehicle. The battery system can include a plurality of battery modules. Each of the battery modules can include one or more cells. The battery modules are selectively electrically connectable to a terminal of the battery system, e.g. in parallel with one another, in order to provide electrical power to the vehicle. A heat transfer assembly can be used for selectively heating and/or cooling one or more of the battery modules, and a controller can be configured to determine a desired capacity of the battery system, determine a number of the battery modules to be heated and/or cooled by the heat transfer assembly according to the desired capacity of the battery system, and operate the heat transfer assembly to heat and/or cool, e.g. directly, the determined number of battery modules, e.g. independently of one another, such that each one of the battery modules to be heated or cooled is either heated or cooled.

The controller may be configured to perform the above-mentioned method. The controller may be configured to selectively connect the battery modules to the terminal. The battery system may be for driving an electric motor of an electric or hybrid vehicle for driving movement of the vehicle.

The heat transfer assembly may be configured to circulate a heat transfer fluid through one or more ducts in thermal communication with one or more of the battery modules, so that heat can be transferred between the fluid and the battery modules.

The heat transfer assembly may comprise one or more valves for controlling the flow of the heat transfer fluid through one or more of the ducts, in order to control which of the battery modules is heated or cooled by the heat transfer fluid.

Each of the valves may control the flow of heat transfer fluid through a respective one of the ducts, which may be arranged to heat or cool a respective one of the battery modules.

The valves may be actively controlled. For example, the controller may be configured to control the operation of one or more of the valves, e.g. according to the desired capacity of the battery system. For example, if the desired capacity is less than or equal to a first capacity, the controller may control the operation of the valves so that heat transfer fluid is passed through a first passage for heating or cooling a first battery module. If the desired capacity is greater than the first capacity, the controller may control the operation of the valves so that heat transfer fluid is passed through the first passage and a second passage for heating or cooling a first battery module and heating or cooling a second battery module respectively.

Additionally, or alternatively, the controller may be configured to control the operation of the one or more valves based on a temperature of one or more of the battery modules. For example, when the temperature of the first battery module is greater than or equal to a threshold temperature and/or when the temperature of the first battery module is less than is equal to a further threshold temperature, e.g., is within a desired operating temperature range, the controller may control the operation of the valves so that heat transfer fluid is passed through a second passage so that a second battery module is heated or cooled by the heat transfer assembly.

The heat transfer assembly may comprise one or more passively controlled, e.g. thermostatically controlled, valves for controlling the flow of the heat transfer fluid through one or more of the passages, in order to control which of the battery modules is heated or cooled by the heat transfer fluid.

One or more battery modules within a first group of battery modules may be arranged to be heated and/or cooled directly by the heat transfer assembly. One or more battery modules within a second group of battery modules may be arranged in thermal communication with the battery modules within the first group, so that the one or more battery modules within the second group are heated or cooled through thermal conduction via the battery modules within the first group, e.g., not via heat transmitted through any others of the battery modules.

The controller may be configured to electrically connect the battery modules that: are being heated or cooled by the heat transfer assembly, and/or are within a desired operation temperature range of the battery modules, to the terminal.

To avoid unnecessary duplication of effort and repetition of text in the specification, certain features are described in relation to only one or several aspects or embodiments of this disclosure. However, it is to be understood that, where it is technically possible, features described in relation to any aspect or embodiment of the disclosure may also be used with any other aspect or embodiment of the disclosure.

BRIEF DESCRIPTION OF THE FIGURES

The various features and advantages of the disclosed examples will become apparent to those skilled in the art from the detailed description. The figures that accompany the detailed description can be briefly described as follows:

FIG. 2 is a flow chart illustrating a method for a battery system according to arrangements of the present disclosure;

DETAILED DESCRIPTION

The present disclosure relates to battery systems for vehicles, such as a motor vehicles (e.g. cars, vans, trucks, motorcycles etc.), industrial or agricultural vehicles (e.g. tractors, forklifts, bulldozers, excavators etc.), marine vessels, aircraft or any other type of vehicle.

Figure 1:
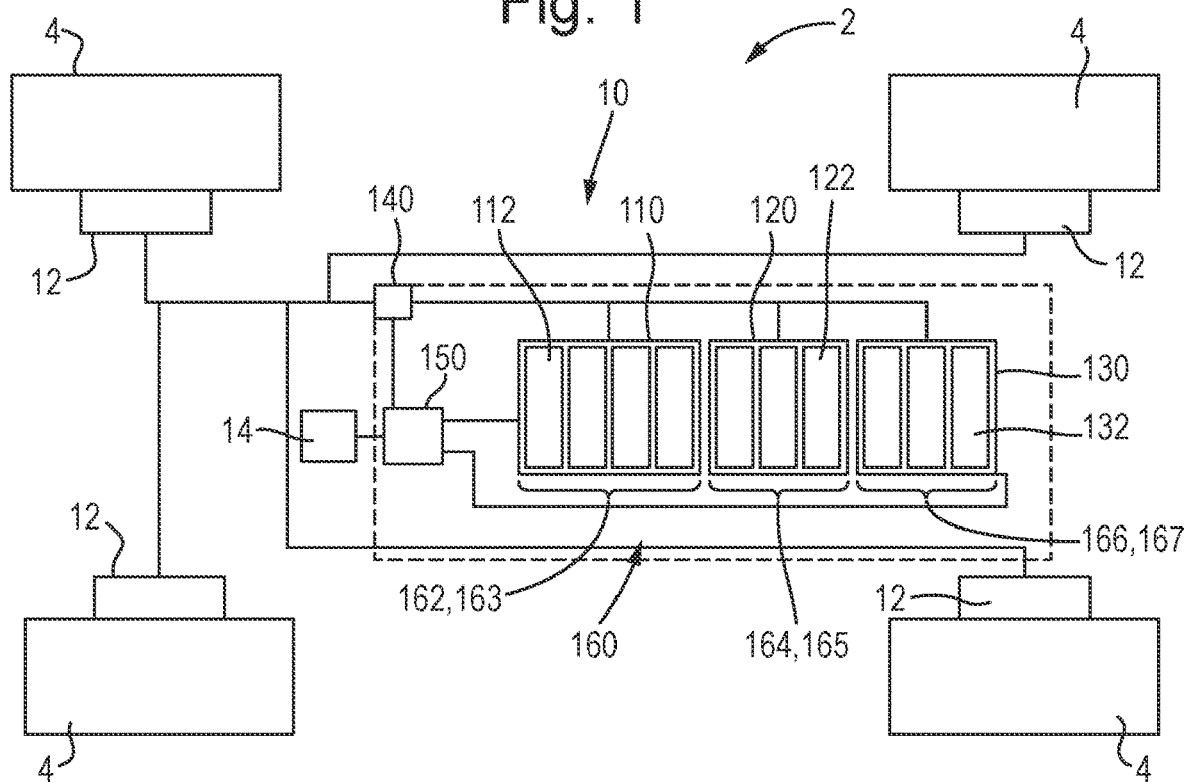
FIG. 1 is a schematic view of an electrical system for a vehicle comprising a battery system according to the present disclosure.

With reference to FIG. 1, an electrical system 10, for a vehicle 2, such as a hybrid motor vehicle or an electric vehicle, comprises one or more power consuming devices, such as electric drive motors 12 for driving one or more road wheels 4 of the vehicle and a battery system 100 according to the present disclosure, for providing electrical power to the power consuming devices.

The battery system 100 comprises a plurality of battery modules 110, 120, 130. In the arrangement shown, the battery system comprises a first battery module 110, a second battery module 120 and a third battery module 130. However, in other arrangements, the battery system 100 may comprise any other desirable number of battery modules.

Each of the battery modules comprises a plurality of battery cells 112, 122, 132. In the arrangement shown, the first battery module 110 comprises four cells 112, the second battery module 120 comprises three battery cells 122 and the third battery module 130 comprises three battery cells 132. In other arrangements, the battery modules may comprise any desirable number of battery cells. Further, one, more than one or each of the battery modules may comprise a different number of battery cells from the other battery modules. Additionally, or alternatively, two, more than two or each of the battery modules may comprise the same number of cells as others of the battery modules. In some arrangements, each of the battery modules may comprise the same number of battery cells.

The battery cells 112, 122, 132 within each battery module 110, 120, 130 may be electrically connectable to one another in parallel and/or series, so that the battery modules 110, 120, 130 can supply electrical power at a desirable voltage and/or current, e.g. to the power consuming components of the electrical system 10. A capacity of the battery modules 110, 120, 130 may depend on the number of battery cells within the particular battery module.

The battery system 100 further comprises a terminal 140. The power consuming components of the vehicle electrical system 10 may be coupled to the battery system 100 at the terminal 140 in order to be supplied with electrical power from the battery system 100. The battery system 100 may be configured to selectively electrically connect the battery modules 110, 120, 130 to the terminal 140, so that electrical power can be supplied from the battery modules 110, 120, 130 to the power consuming components.

The battery modules 110, 120, 130 may be electrically connectable to the terminal 140 in parallel with one another. In this way a capacity of the battery system 100, e.g. an amount of energy that can be supplied by the battery system, may vary depending on which of the battery modules 110, 120, 130 are electrically connected to the terminal 140.

The battery system 100 may comprise a battery system controller 150 configured to selectively electrically connect and/or disconnect the battery modules 110, 120, 130 to and/or from the terminal 140. The battery modules 110, 120, 130 may be electrically connectable to the terminal 140 independently of one another.

The battery cells 112, 122, 132 within the battery modules 110, 120, 130 may have a desirable operating temperature range within which the battery cells can supply electrical power with a greater efficiency compared to when the battery cells 112, 122, 132 are operating outside of the desirable operating temperature range. For example, an internal resistance of the battery cells 112, 122, 132 may be greater when operating outside the desirable operating temperature range.

The battery system 100 further comprises a heat transfer assembly 160 for selectively heating or cooling the battery modules 110, 120, 130 to adjust a thermal energy level of the battery modules 110, 120, 130. In some examples, the adjusting of the thermal energy level includes heating one or more of the battery modules 110, 120, 130. In other examples, the adjusting of the thermal energy level includes cooling one or more of the battery modules 110, 120, 130. In still other examples, the adjusting of the thermal energy level includes heating some of the battery modules 110, 120, 130, while cooling other battery modules 110, 120, 130. The operation of the heat transfer assembly 160 may be controlled by the battery system controller 150, e.g. as described below, in order to heat or cool the respective battery modules to the desirable operating temperature range of the battery cells 112, 122, 132.

As shown, the heat transfer assembly 160 may comprise a plurality of heat transfer modules 162, 164, 166 arranged to heat or cool respective ones of the battery modules 110, 120, 130. In particular, a first heat transfer module 162 may be arranged to heat or cool the first battery module 110, a second heat transfer module 164 may be arranged to heat or cool the second battery module 120 and a third heat transfer module 166 may be arranged to heat or cool the third battery module 130. The number of heat transfer modules may correspond to the number of battery modules.

In other arrangements, one or more than one of the heat transfer modules may be arranged to heat or cool more than one of the battery modules. In such arrangements, the heat transfer assembly 160 may comprise a different number of heat transfer modules compared to the number of battery modules. Additionally, or alternatively, two or more of the heat transfer modules may be arranged to heat or cool one or more of the same battery modules. For example, two heat transfer modules may be arranged to heat or cool one or more battery module together.

The heat transfer assembly 160 may be configured to control the operation of the heat transfer modules 162, 164, 168 independently of one another, in order to heat or cool one or more of the battery modules 110, 120, 130 substantially independently of others of the battery modules. In some arrangements, each of the battery modules may be heated or cooled independently of the other battery modules.

The heat transfer modules 162, 164, 166 may be arranged in thermal contact with the battery module or modules that the heat transfer module is configured to heat or cool, e.g. such that heat can be transferred from the heat transfer modules to the battery module, or from the battery module to the heat transfer module, through thermal conduction.

The controller 150 may be configured to control the operation of the heat transfer assembly 160. The controller 150 may control the operation of the heat transfer assembly 160 to operate the heat transfer modules 162, 164, 166, e.g. independently of one another, in order to heat or cool one, more than one or each of the battery modules 110, 120, 130. For example, the controller 150 may control the heat transfer modules 162, 164, 166 in order to heat or cool one, more than one or each of the battery modules to within their desirable operating temperature ranges.

With reference to FIG. 2, the controller 150 may control the operation of the heat transfer assembly 160 according to a method 200. The method 200 comprises a first block 204 at which a desired capacity of the battery system 100, e.g. a desired amount of energy to be supplied by the battery system to power consuming devices of the vehicle, is determined. The desirable amount of energy may be the energy desired, e.g. predicted to be required, for a particular trip or journey to be performed by the vehicle.

The method 200 comprises a second block 206, at which the number of battery modules 110, 120, 130 to be heated or cool by the heat transfer assembly 160 is determined, e.g. in order to bring the desired number of battery modules to within their desirable temperature ranges. The number of battery modules to be heated and/or cooled may be determined based or the desired capacity of the battery system 100. For example, the number of battery modules determined to be heated and/or cooled may correspond to the number of battery modules to be connected to the terminal 140 in order to provide the desired capacity from the battery system 100. As described above, the battery modules may comprise different numbers of cells, and hence, the different battery modules may have different capacities from one another. The battery modules to be heated and/or cooled may be selected based on the numbers of cells in the battery modules, in order to provide the desired capacity.

As mentioned above, the battery system 100 may be for providing power to electric drive motors 12 of the vehicle 2 for driving movement of the vehicle. Accordingly, the capacity of the battery system 100, e.g. the amount of energy that can be supplied by the battery system, may correspond to a possible range of the vehicle when being powered by the battery system 100. The method 200 may comprise a range determination block 202, at which a desired range of the vehicle 2 is determined. The desired capacity of the battery system may be determined, e.g. in the first block 204, based on the desired range of the vehicle. The desired capacity may further comprise an amount of energy for powering any other power consuming devices to be used as the vehicle travels through the determined range.

In some arrangements, the desired range of the vehicle may be determined, e.g. in the range determination block 202 based on a distance expected to be travelled by the vehicle, using power from the battery system 100, during a current journey of the vehicle, e.g. that the vehicle is currently performing or is expected to perform as the next journey to be performed by the vehicle.

Returning to FIG. 1, the electrical system 10 of the vehicle may comprise a navigation controller 14, such as a satellite, e.g., GPS, navigation controller. The navigation controller 14 may be operable, e.g. by a user of the vehicle, to plan a journey to be performed by the vehicle 2. Further, the navigation controller 14 may be configured to predict a journey to be performed by the vehicle based on, for example, a time of day, week, month and/or year at which the journey is being performed, the location of the vehicle and/or a history of journeys that have been performed by the vehicle 2.

The battery system controller 150 may be configured to receive information from the navigation controller 14 indicating a distance of a route or journey expected, e.g. planned to predicted, to be travelled by the vehicle 2. The desirable range of the vehicle may be determined based on the information received. For example, the desirable range may be set to the length of the planned or predicted route.

Returning to FIG. 2, the method 200 may comprise a third block 208, at which the battery modules, e.g. that were determined in the second block 206, are heated or cooled, e.g. respectively, by the heat transfer assembly 160, e.g. in order to bring the respective battery modules into their desirable operating temperature ranges.

Each of the battery modules 110, 120, 130 that are to be heated or cooled, e.g. as determined in the second block, may be heated or cooled at the same time, e.g. substantially simultaneously. Alternatively, the battery modules to be heated or cooled may be heated or cooled sequentially. For example, one particular battery module to be heated or cooled to the desirable operating temperature range and another battery module may be heated or cooled once the particular battery modules has reached the desirable operating range.

The method 200 may further comprise a fourth block 212, at which the battery system controller 150 controls the battery system 100 to electrically connect one or more of the battery modules 110, 120, 130 to the terminal, e.g. such that the battery system 100 is configured to supply the desired capacity to the power consuming components of the electrical system 10. The battery modules connected to the terminal 140 may correspond to the battery modules that have been and/or are currently being heated or cooled by the heat transfer assembly 160. In some arrangements, each of the battery modules determined at the second block 206 may be connected to the terminal.

In some arrangements, the controller 150 may be configured to selectively electrically disconnect one or more of the battery modules 110, 120, 130 from the terminal. For example, the controller may disconnect the battery modules from the terminal when the battery modules are being heated or cooled by the heat transfer assembly 160.

The method 200 may comprise a temperature determination block 210 at which temperatures of one or more of the battery modules are determined. The battery modules may be connected to the terminal 140, e.g. in the fourth block 212, if the temperature of the battery module is within the desirable operating temperature range of the battery modules.

If it is determined, e.g. in the temperature determination block 210, that one or more particular battery modules 110, 120, 130 that are connected to the terminal 140, are outside of their desirable operating temperature ranges, the heat transfer assembly 160 may be controlled to operate the heat or cool transfer modules in order to bring the particular battery module(s) into their desirable operating temperature ranges, e.g. by heating or cooling the particular battery module(s). In some arrangements, the controller 150 may be configured to selectively electrically disconnect one or more of the battery modules 110, 120, 130 from the terminal if the batteries are outside of their desirable operating temperature ranges.

The blocks of the method 200 described above may be performed sequentially in any desirable order. In some arrangements, one, more than one, or each of the blocks may be performed concurrently, e.g. at substantially the same time.

In the arrangement shown in FIG. 1, the heat transfer assembly 160 comprises an electric heater/cooler and each of the heat transfer modules 162, 164, 166 comprises one or more thermoelectric devices 163, 165, 167, such as resistive heating elements and/or thermoelectric cooling devices, e.g., Peltier devices. The heat transfer modules are operated by passing an electric current through the appropriate thermoelectric device. In other arrangements, the heat transfer assembly 160 may be configured to heat the battery modules only, and may comprise an electric heater, e.g., comprising one or more electric, e.g. resistive, heating elements. In other words, the heat transfer assembly 160 may not comprise a thermoelectric cooling device.

Figure 3:
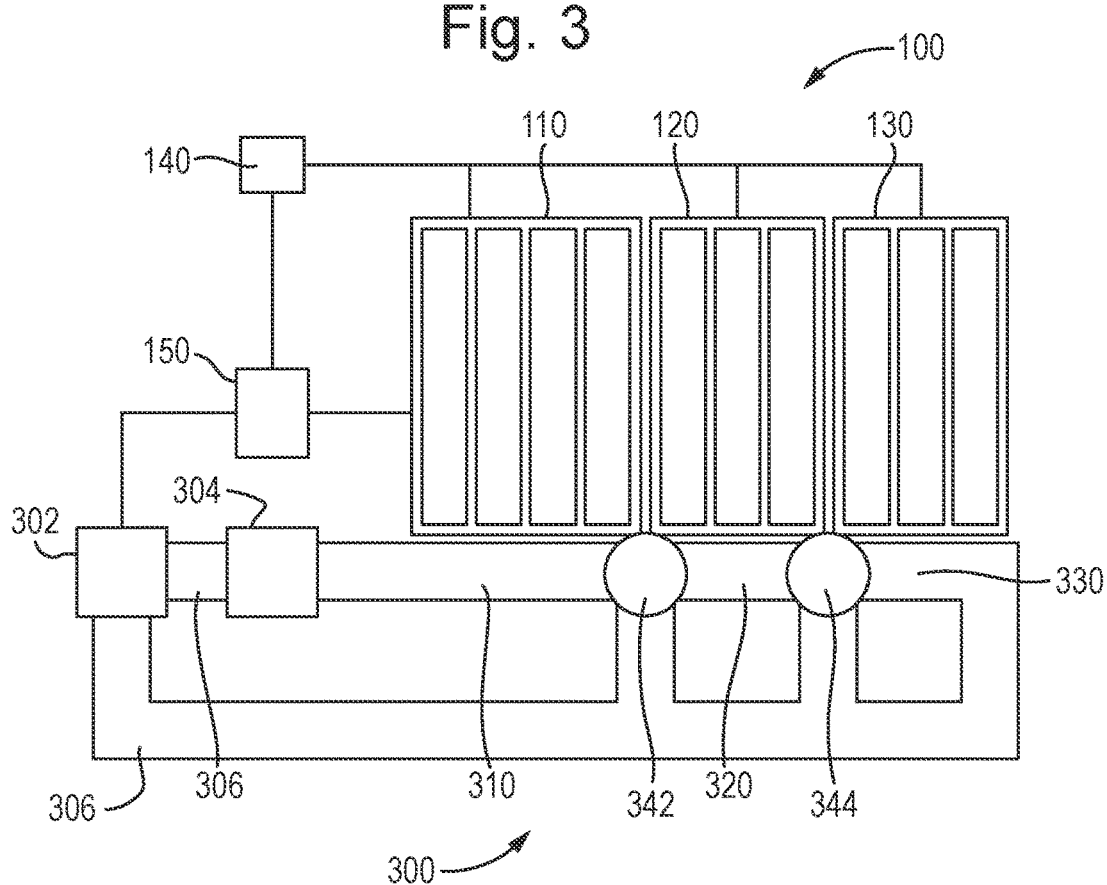
FIG. 3 is a schematic view of a battery system according to arrangements of the present disclosure.

With reference to FIG. 3, another heat transfer assembly 300, which may be used within the battery system 100 depicted in FIG. 1 in place of the heat transfer assembly 160, will now be described. The heat transfer assembly 300 may be arranged in a similar way to the heat transfer assembly 160 described above and features of the heat transfer assembly 160 may apply equally to the heat transfer assembly 300.

The heat transfer assembly 300 differs from the heat transfer assembly 160 described above in that the heat transfer assembly 300 is configured to circulate a heat transfer fluid between a plurality of heat transfer modules 310, 320, 330 of the heat transfer assembly, in order to heat the battery modules that are arranged in thermal contact with the respective heat transfer modules. The heat transfer modules 310, 320, 330 may comprise ducts, for receiving the heat transfer fluid, in thermal contact with the battery modules 110, 120, 130, e.g. such that heat can be transferred between the heat transfer modules and the battery modules by thermal conduction.

As depicted, a first heat transfer module 310 may be arranged in thermal contact with the first battery module 110, a second heat transfer module 320 may be arranged in thermal contact with the second battery module 120 and a third heat transfer module 330 may be arranged in thermal contact with the third battery module 130. In other arrangement, the heat transfer modules 310, 320, 330 may be arranged to heat different ones of the battery modules, e.g. in the same way as the heat transfer modules 162, 164, 166 of the heat transfer assembly 160 described above.

The heat transfer assembly 300 further comprises a pump 302 and a heat transfer fluid heater/cooler 304 operable to heat or cool the heat transfer fluid. The heat transfer assembly 300 may further comprise one or more ducts 306 for carrying heat transfer fluid between the pump 302, the heater/cooler 304 and the heat transfer modules 310, 320, 330. The pump 302 is configured to circulate a heat transfer fluid through the ducts 306. The heat transfer fluid heater/cooler 304 is configured to heat or cool the heat transfer fluid being passed through the heat transfer fluid heater/cooler 304.

The heat transfer assembly 300 may comprise one or more control valves 342, 344 configured to control the flow of heat transfer fluid to the heat transfer modules. For example, the heat transfer assembly 300 may comprise a first control valve 342 for controlling the flow of heat transfer fluid to the second heat transfer modules 320 and a second control valve 344 for controlling the flow of heat transfer fluid to the third heat transfer module 330.

As depicted, the heat transfer modules 310, 320, 330 may be arranged to receive heat transfer fluid from the ducts 306 in series with one another. In such arrangements, each of the valves may control the flow of heat transfer fluid to the heat transfer modules arranged beyond the particular valve, in the series arrangement of heat transfer modules. For example, when the first valve 342 is closed, heat transfer fluid leaving the first heat transfer module 310 may be diverted by the first valve to return to the pump 302 and/or heater/cooler 304 without passing through the second and third heat transfer modules 320, 330. In a similar way, when the second valve 344 is closed, heat transfer fluid leaving the second heat transfer module 320 may be diverted by the first valve to return to the pump 302 and/or heater/cooler 304 without passing through the third heat transfer module 330.

In other arrangements, the heat transfer modules 310, 320, 330 may be arranged to receive heat transfer fluid from the ducts 306 in parallel with one another. In such arrangements, the control valves 342, 344 may be arranged to control the flow of heat transfer fluid to the heat transfer modules substantially independently of the flow of that transfer fluid to the other heat transfer modules.

The battery system controller 150 may control the heat transfer assembly 300 to operate the pump 302, heater/cooler 304, and control valves 342, 344 in order to control the battery modules that are heated by the heat transfer assembly 300, e.g. according to the method 200 described above.

Figure 4:
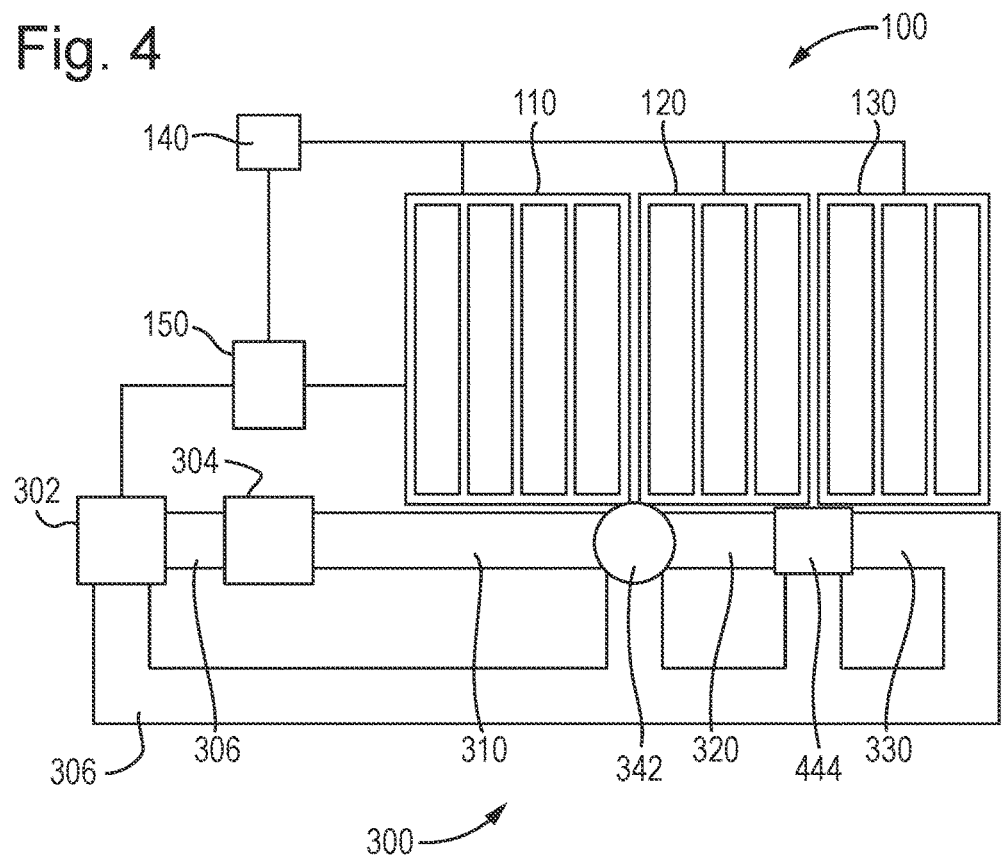
FIG. 4 is a schematic view of a battery system according to another arrangement of the present disclosure.

In the arrangement shown in FIG. 3, the first and second control valves 342, 344 are actively controllable by the battery system controller 150, in order to selectively supply heat transfer fluid to the second and third heat transfer modules 320, 330. However, in other arrangements, the flow of heat transfer fluid to one or more of the heat transfer modules 310, 320, 330 may be controlled by a passively controlled valve. For example, one or more of the control valves may be thermostatic control valves configured to open when a temperature of heat transfer fluid at the valve is equal to or greater than respective threshold temperatures. In particular, the first control valve may be a thermostatic control valve configured to open to enable heat transfer fluid to flow towards the second heat transfer module 320 when the temperature of heat transfer fluid at the first control valve is greater than or equal to a first threshold temperature. Additionally, or alternatively, the second control valve may be a thermostatic control valve configured to open to enable heat transfer fluid to flow towards the third heat transfer module 330 when the temperature of heat transfer fluid at the second control valve is greater than or equal to a second threshold temperature In the arrangement shown in FIG. 4, the first control valve 342 is an actively controlled valve and the second control valve 444 is a passively controlled valve, such as a thermostatic control valve.

When the first and second battery modules 110, 120 are at temperatures less than the desirable operating temperature range of the battery modules, the heat transfer fluid leaving the first and second battery modules 120, 130 may be below the second threshold temperature and the second control valve 444 may remain closed.

Once the first and second battery modules have been heated to their desirable operating temperatures, the heat transfer fluid leaving the second heat transfer module, may be equal to or greater than the second threshold temperature. The second control valve 444 may therefore open to permit the heat transfer fluid to flow into the third heat transfer module 330 to heat the third battery module.

Figure 5:
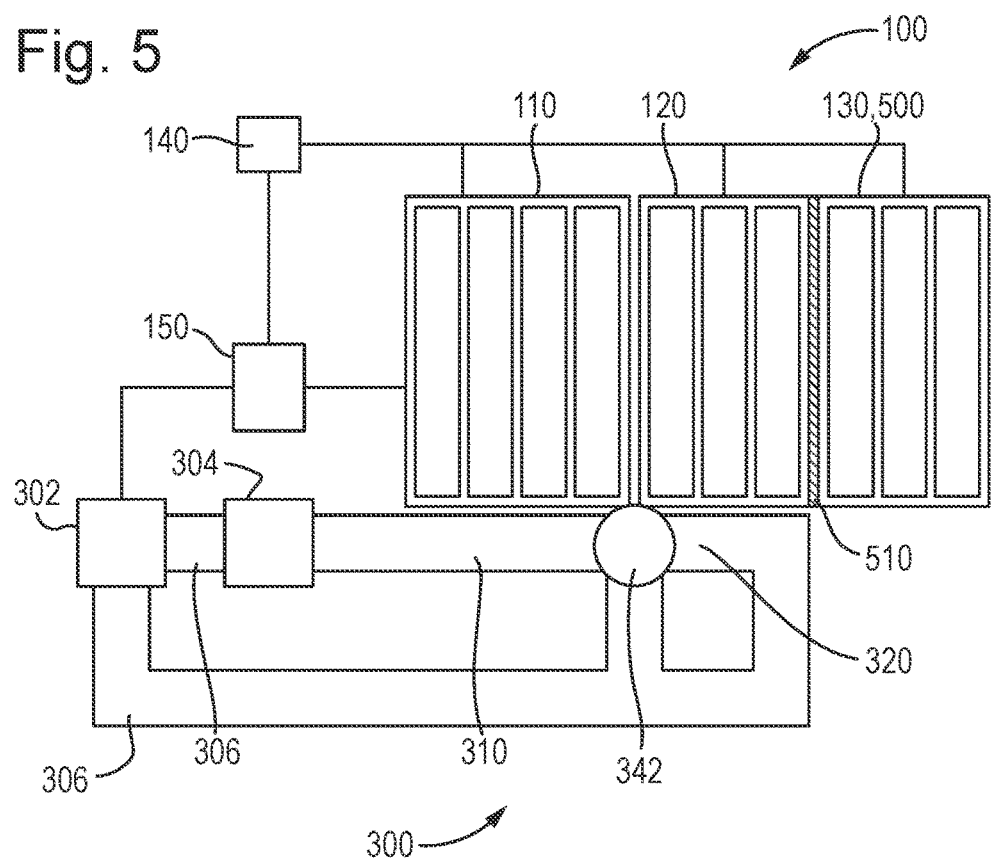
FIG. 5 is a schematic view of the electrical system comprising a battery system according to another arrangement of the present disclosure.

In other arrangements of the present disclosure, one or more of the battery modules, may not be associated with a heat transfer module arranged to heat, e.g. directly heat, or cool, e.g. directly cool, the battery module, such batty modules may be referred to as unregulated battery modules 500. For example, as shown in FIG. 5, the third heat transfer module 330 has been omitted and the third battery module 130 is an unregulated battery module 500. As depicted, the third, unregulated battery module does not have an associated heat transfer module.

In such arrangements, the unregulated battery module 500 may be arranged such that it is thermally connected to one or more others of the battery modules, such that the unregulated battery module is heated via the other battery modules through thermal conduction. For example, as shown in FIG. 5, a thermally conductive material 510 is arranged between the second battery module and the unregulated, third battery module.

In the arrangements described above, the heat transfer assemblies 160, 300 are capable of both increasing and decreasing the temperatures of the battery modules to within their desired operating ranges. However, in other arrangements, the heat transfer modules 162, 164, 166 may be for heating the battery modules only. In such arrangements, the heater/cooler 304 may be a heater, e.g. operable to heat the heat transfer fluid only.

The following additional, statements are also included within the specification and form part of the present disclosure.

A battery system for a vehicle has a plurality of battery modules that each comprising one or more cells. The battery modules are selectively electrically connectable to a terminal of the battery system in order to provide electrical power to the vehicle. The battery system further includes a heat transfer assembly for selectively heating and/or cooling one or more of the battery modules respectively. A method for the battery system includes, among other things determining a desired capacity of the battery system, determining a number of the battery modules to be heated and/or cooled by the heat transfer assembly according to the desired capacity of the battery system, and operating the heat transfer assembly to heat and/or cool the determined number of battery modules.

In another example of the foregoing method, the number of battery modules heated and/or cooled by the heat transfer assembly corresponds to the number of battery modules required to be connected together in order for the battery system to provide the desired capacity.

Another example of any of the foregoing methods includes determining a desirable range of a vehicle to be powered by the battery system. The desired capacity of the battery system is determined based on the desirable range of the vehicle.

Another example of any of the foregoing methods includes determining a journey to be performed by the vehicle, wherein the desirable range of the vehicle is determined based on a length of the journey to be performed.

Another example of any of the foregoing methods includes receiving information from a navigation system indicating a distance of a journey planned to be travelled by the vehicle. The desired range of the vehicle is determined based on the information from the navigation system.

Another example of any of the foregoing methods includes determining a temperature of a battery module, comparing the determined temperature to a desirable operating temperature range of the battery module, and operating the heat transfer assembly to heat or cool the battery module if the determined temperature of the battery module is outside the desirable operating temperature range.

Another example of any of the foregoing methods includes connecting the battery module to the terminal if the determined temperature is within the desirable operating temperature range.

A battery system for a vehicle according to another exemplary aspect of the present disclosure includes, among other things, a plurality of battery modules. Each of the battery modules includes one or more cells. The battery modules are selectively electrically connectable to a terminal of the battery system, in order to provide electrical power to the vehicle. A heat transfer assembly used for selectively heating and/or cooled one or more of the battery modules, and a controller configured to determine a desired capacity of the battery system, determine a number of the battery modules to be heated and/or cooled by the heat transfer assembly according to the desired capacity of the battery system, and operate the heat transfer assembly to heat and/or cool the determined number of battery modules.

In another example of the foregoing system, the heat transfer assembly is configured to circulate a heat transfer fluid through one or more ducts in thermal communication with one or more of the battery modules so that heat can be transferred between the fluid and the battery modules.

In another example of any of the foregoing system, the heat transfer assembly includes one or more valves for controlling the flow of the heat transfer fluid through one or more of the ducts, in order to control which of the battery modules is heated or cooled by the heat transfer fluid.

In another example of any of the foregoing systems, the controller is configured to control the operation of one or more of the valves.

In another example of any of the foregoing systems, the controller is configured to control the operation of the one or more valves based on a temperature of one or more of the battery modules.

In another example of any of the foregoing systems, the heat transfer assembly includes one or more passively controlled valves for controlling the flow of the heat transfer fluid through one or more of the passages, in order to control which of the battery modules is heated or cooled by the heat transfer fluid.

In another example of any of the foregoing systems, one or more battery modules within a first group of battery modules are arranged to be heated and/or cooled directly by the heat transfer assembly, and one or more battery modules within a second group of battery modules are arranged in thermal communication with the battery modules within the first group, so that the one or more battery modules within the second group are heated or cooled through thermal conduction via the battery modules within the first group.

In another example of any of the foregoing systems, the controller is configured to electrically connect the battery modules that are being heated or cooled by the heat transfer assembly, and/or are within a desired operation temperature range of the battery modules, to the terminal.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A method for a battery system for a vehicle, the method comprising:
    operating a heat transfer assembly via a controller configured to adjust a thermal energy level of a number of battery modules within a battery system, the number of the battery modules having a thermal energy level to be adjusted by the heat transfer assembly based on a desired capacity of the battery system,
    the battery system including the plurality of battery modules and the heat transfer assembly,
    the battery modules each including one or more cells, the battery modules selectively electrically connectable to a terminal of the battery system in order to provide electrical power to the vehicle,
    the heat transfer assembly for selectively adjusting a thermal energy level of one or more of the battery modules.

2. The method of claim 1, wherein the adjusting of the thermal energy level includes heating one or more of the battery modules, cooling one or more of the battery modules, or heating one or more of the battery modules while cooling one or more others of the battery modules.

3. The method of claim 1, wherein the number of battery modules having a thermal energy level adjusted by the heat transfer assembly corresponds to the number of battery modules required to be connected together in order for the battery system to provide the desired capacity.

4. The method of claim 1, wherein the desired capacity of the battery system is based, at least in part, on a desirable range of the vehicle.

5. The method of claim 4, further comprising wherein a desirable range of the vehicle is based, at least in part, on a length of the journey to be performed.

6. The method of claim 4, further comprising receiving information from a navigation system indicating a distance of a journey planned to be travelled by the vehicle, wherein the desirable range of the vehicle is based, at least in part, on the information from the navigation system.

7. The method of claim 1, further comprising:
    establishing a determined temperature of a given one of the battery modules;
    comparing the determined temperature to a desirable operating temperature range of the given battery module; and
    operating the heat transfer assembly to heat or cool the given battery module if the determined temperature of the given battery module is outside the desirable operating temperature range.

8. The method of claim 7, further including connecting the battery module to the terminal if the determined temperature is within the desirable operating temperature range.

9. A battery system for a vehicle, the battery system comprising:
    a plurality of battery modules, each of the battery modules including one or more cells, wherein the battery modules are selectively electrically connectable to a terminal of the battery system, in order to provide electrical power to the vehicle;
    a heat transfer assembly for selectively adjusting a thermal energy level of one or more of the battery modules; and
    a controller configured to operate the heat transfer assembly to adjust the thermal energy level of a number of battery modules, the number of the battery modules having a thermal energy level to be adjusted by the heat transfer assembly based on a desired capacity of the battery system.

10. The battery system of claim 9, wherein the adjusting of the thermal energy level includes heating one or more of the battery modules, cooling one or more of the battery modules, or heating one or more of the battery modules while cooling one or more others of the battery modules.

11. The battery system of claim 9, wherein the heat transfer assembly is configured to circulate a heat transfer fluid through one or more ducts in thermal communication with one or more of the battery modules, so that heat can be transferred between the fluid and the battery modules.

12. The battery system of claim 11, wherein the heat transfer assembly comprises one or more valves for controlling the flow of the heat transfer fluid through one or more of the ducts, in order to control which of the battery modules is heated or cooled by the heat transfer fluid.

13. The battery system of claim 12, wherein the controller is configured to control the operation of one or more of the valves.

14. The battery system of claim 13, wherein the controller is configured to control the operation of the one or more valves based on a temperature of one or more of the battery modules.

15. The battery system of claim 9, wherein the heat transfer assembly comprises one or more passively controlled valves for controlling the flow of the heat transfer fluid through one or more of the passages, in order to control which of the battery modules is heated or cooled by the heat transfer fluid.

16. The battery system of claim 9, wherein one or more battery modules within a first group of battery modules are arranged to be heated and/or cooled directly by the heat transfer assembly, and one or more battery modules within a second group of battery modules are arranged in thermal communication with the battery modules within the first group, so that the one or more battery modules within the second group are heated or cooled through thermal conduction via the battery modules within the first group.

17. The battery system of claim 9, wherein the controller is configured to electrically connect the battery modules that are being heated or cooled by the heat transfer assembly, the battery modules that are within a desired operation temperature range of the battery modules, or both to the terminal.

* * * * *